June 4, 1963
G. E. EVANS
3,091,881
SIGNALLING DEVICE
Filed Oct. 5, 1961
2 Sheets-Sheet 1
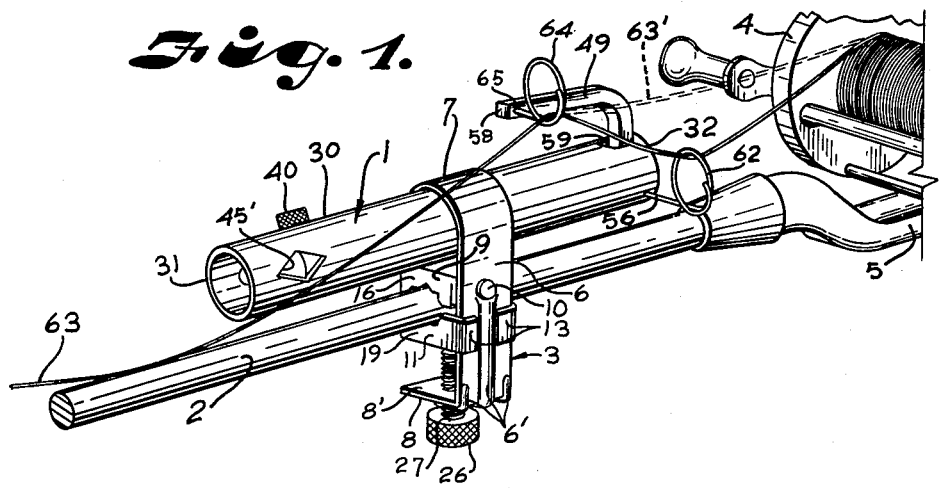
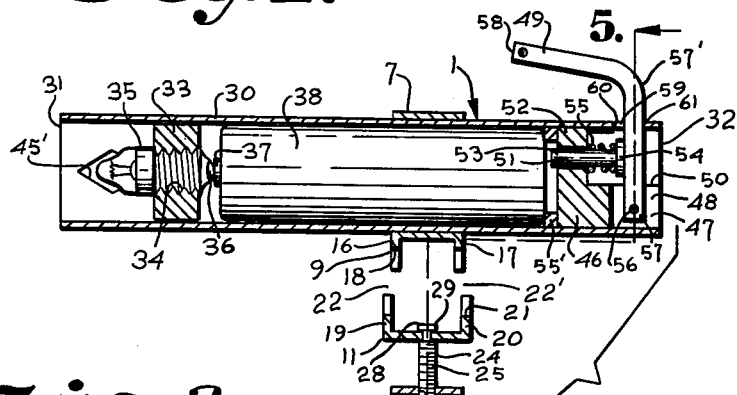
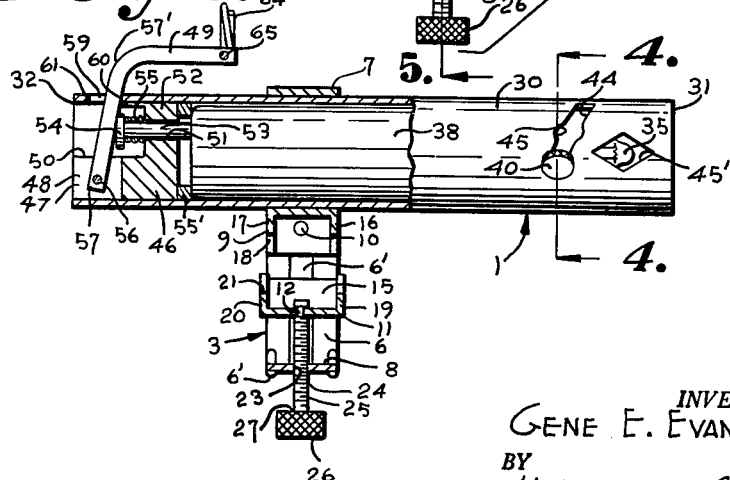
INVENTOR.
GENE E. EVANS
BY
Fishburn and Gold
ATTORNEYS June 4, 1963 G. E. EVANS 3,091,881
SIGNALLING DEVICE
Filed Oct. 5, 1961 2 Sheets-Sheet 2

INVENTOR.
GENE E. EVANS
BY
*Fishburn & Gold*
ATTORNEYS

# United States Patent Office 3,091,881
Patented June 4, 1963

3,091,881
SIGNALLING DEVICE
Gene E. Evans, 806 E. 12th St., Lawrence, Kans.
Filed Oct. 5, 1961, Ser. No. 143,112
4 Claims. (Cl. 43—17)

This invention relates to signalling attachments for fishing poles, and more particularly to an improvement in such devices which are responsive to the tension of the fish line.

Various devices have been provided for producing a signal when a fish strikes and tensions a fishing line. However, such devices, if sufficiently sensitive, have been too fragile for heavy use or, if rugged, lacked the requisite sensitivity to produce a signal on light tensioning due to "nibbling."

It is, therefore, the principal objects of the present invention to provide a fishing signal light which is highly sensitive in use and yet extremely rugged in construction; to provide such a device which permits a fishing line to be cast while threaded therethrough without significant additional drag thereon; to provide such a signal light construction which includes a clamp device adapted to easily secure the signal light to fishing poles of widely varying diameters; to provide such a signalling attachment for fishing poles which is adapted to respond to different degrees of tension in the fish line without adjustment thereto; to provide such a device which can be easily deactuated when not in use; and to provide such a fishing line operated device which is simple in construction, inexpensive to build and reliable and versatile in use.

Other objects and advantages of this invention will become apparent from the following description taken in connection with the accompanying drawings wherein are set forth by way of illustration and example certain embodiments of this invention.

FIG. 1 is a perspective view of the line tension responsive signalling device secured to a fishing pole with the fishing line threaded therethrough.

FIG. 2 is a sectional view longitudinally through the signalling device showing the device in the off position but ready for actuation.

FIG. 3 is a side elevation with a portion broken away showing the device producing a signal.

Figure 4:
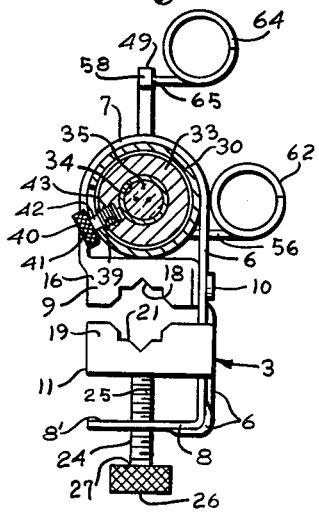
FIG. 4 is a sectional view through the device taken on the line 4—4 of FIG. 3, showing the incandescent bulb holding disc.

Referring to the drawings in more detail:

In the example shown, the reference numeral 1 indicates generally a fishing signal light mounted on a fishing pole 2 by means of a clamping device 3. The fishing pole 2 is illustrated with a horizontal cage type fishing reel 4 secured thereto by conventional means (not shown) on a handle 5. However, it is here noted that a spinning type reel may be substituted for the reel 4 without departing from the spirit of this invention.

The clamping device 3 has a vertically extending rigid strap 6 having strengthening ribs 6' and a curved upper end portion 7 and a horizontally extending lower end portion or platform 8. A fixed clamp member 9 is secured by means of a rivet 10 or the like at a position intermediate the strap end portions 7 and 8 and extends substantially perpendicularly to the strap 6 as best indicated in FIG. 4.

A movable clamp member 11 having an elongated slot 12 therein exhibits integral guide lips 13 which are slidably engaged with the strap 6 for maintaining the clamp member 11 perpendicular to the strap 6 and between the lower end portion or platform 8 and the fixed clamp member 9. The slot 12 has an enlarged end portion 14 for a purpose described hereinafter. A lip 15 cooperates with the guides 13 to maintain the clamp member 11 perpendicular to but slidable on the rigid strap 6.

The fixed clamp member 9 has a pair of spaced downwardly extending wall portions 16 and 17 each exhibiting lower edges shaped to form concave, substantially semicircular serrated cut-out portions 18. The movable clamp member 11 exhibits upwardly extending spaced wall portions 19 and 20 each having upper edges shaped to form concave, upwardly facing substantially semi-circular, serrated cut-out portions 21. The fixed clamp member wall portions 16 and 17 are spaced slightly closer together than the movable clamp member wall portions 19 and 20 whereby said wall portions overlap to form a pair of fishing rod receiving openings 22 and 22' aligned in horizontally spaced relation and adjustable in size in response to the distance the clamp members 9 and 11 are spaced apart.

Figure 5:
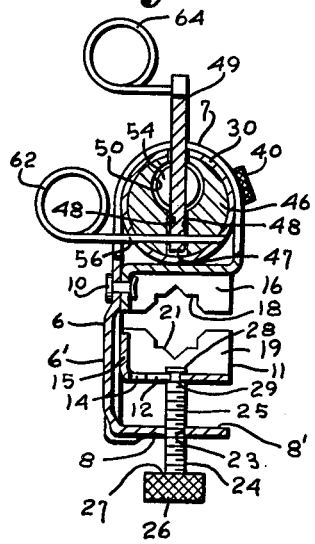
FIG. 5 is a sectional view through the device taken on the line 5—5, of FIG. 2, particularly showing the mounting of the trigger arm.

The strap lower end portion 8 extends perpendicularly to the rigid strap 6 forming a platform 8' which has a vertically extending threaded bore 23 therethrough. A vertically extending rod 24 exhibits threads 25 engaged with the threaded bore 23. The rod 24 has a knurled finger knob 26 on the lower end 27 thereof and a grooved head 28 integral with the upper end 29 thereof. The grooved head 28 engages in the slot 12 of the movable clamp member 11 as indicated in FIG. 5. The head 28 is adapted to extend through the enlarged head portion 14 of the slot 12 to provide easy engagement with the slot 12 and yet trap the head 28 therein to prevent axial escape therefrom. The rotation of the knob 26 moves the movable clamp member 11 relative to the fixed clamp member 9 for clamping or releasing the fishing rod 2 therebetween.

An elongated tube 30 preferably of brass exhibits a front end 31 and a rear end 32 and is adapted to contain lighting and triggering apparatus described hereinafter. The upper end portion 7 of the strap 6 extends around and engages the tube 30 intermediate the ends 31 and 32. The upper end portion 7 retains the tube 30 spaced from and parallel to the horizontally aligned openings 22 and 22', as best indicated in FIG. 2. The upper end portion 7 of the strap 6 terminates integrally with the fixed clamp member 9 to form a secure clamping structure for the tube 30.

A disc 33 is contained in the tube 30 near the front end 31 and has an outside diameter slightly smaller than the inside diameter of the tube whereby it is slidable longitudinally therewithin. The disc 33 has a threaded bore 34 therethrough coaxial with the axis of the tube 30 and adapted to form a socket for an incandescent bulb 35. The disc 33 is a thickness sufficient to retain the bulb 35 and yet permit the rear contact 36 thereof to extend rearwardly therefrom for contacting the electrode 37 of a penlight battery 38 contained within the tube 30.

The disc 33 also contains a threaded bore 39 perpendicular to the axis of the bore 34 and adapted to receive a screw 40 in threaded engagement therewith. The screw 40 exhibits a knurled finger knob 41 and a slotted portion or neck 42 adjacent one side of the knob 41 having a diameter smaller than that of a threaded portion 43 on the opposite side of the neck 42, FIG. 4. The tube 30 contains a spiral slot 44 extending through an angle of approximately 90 degrees about the tube and exhibiting an enlarged portion 45 approximately in the center thereof. The enlarged portion 45 is adapted to receive the threaded portion 43 of the screw 40, however the balance of the slot 44 will not allow the threaded portion 43 to pass therebetween. When the threaded portion 43 of the screw 40 is engaged with the threaded bore 39 in the disc 33, the screw and disc may be rotated as a unit about the tube 30 with the neck 42 sliding in the spiral slot 44. It is apparent that when the screw 40 is in a position other than in the enlarged portion 45, it cannot be accidentally unscrewed and lost. As the screw 40 and disc 33 are rotated with respect to the tube 30, the disc 33 and bulb 35 mounted therein move axially forwardly and rearwardly of the tube 30. Windows or openings 45' permit the bulb 35 to be seen from the sides of the tube 30 as well as the front.

A cylindrical plug 46 is adapted to fit within and close the rear end 32 of the tube 30. The plug 46 exhibits a vertically extending slotted portion 47 opening rearwardly of the tube 30. The slotted portion 47 is comprised of spaced parallel walls 48 adapted to pivotally retain an arm 49 therebetween in a manner and for a purpose described hereinafter. The plug 46 has a bore 50 extending thereinto longitudinally of the tube 30 but offset from the axis thereof. The slotted portion 47 opens upwardly into the bore 50. Coaxial with the bore 50 is a bore 51 of smaller diameter and extending through the remaining portion 52 of the plug 46. A plunger 53 having a head 54 of greater diameter than the bore 51 but of smaller diameter than the bore 50 is slidably supported in the bore 51 and extends therethrough, FIGS. 2 and 3. A helical spring 55 is spiraled about the plunger 53 between the plunger head 54 and the portion 52 of the plug 46. The spring 55 is adapted to urge the plunger 53 rearwardly of the tube 30. When the spring 55 is compressed by the head 54, the plunger 53 extends past the plug 46 a sufficient distance to contact the rear of the battery 38 which is held spaced from the plug 46 by an annular insulator washer 55'.

A pin 56 extends transversely through the plug 46, past the walls 48 and through the arm 49 to pivotally mount said arm at the lower end 57 thereof for reciprocal pivotal motion in the slotted portion 47. The arm 49 extends upwardly from the end 57 to a point 57' spaced from the tube 30 and then curves forwardly substantially parallel to the axis of the tube 30. The arm 49 terminates in an upper end 58. The tube 30 has a longitudinally extending slot 59 therein through which the arm 49 extends. The slot 59 exhibits a forward wall 60 and a rearward wall 61 which are in the path of movement of the arm 49 and limits the reciprocation thereof about the pin 56.

The arm 49 contacts the head 54 of the plunger 53 between the lower end 57 and the point 57'. The arm 49 is thus urged rearwardly with the plunger 53 by the spring 55, the limit of rearward movement of the arm 49 being determined by the rearward wall 61 of the slot 59, FIG. 2.

An eyelet 62 is formed from a spiraling extension of the pin 56 and extends laterally of the tube 30, FIG. 1. The spiral formation of the eyelet 62 permits the fishing line 63 to be threaded thereinto without access to either end of the line. An eyelet 64 similar in configuration to the eyelet 62 is suitably secured, for example, by a press fit at 65, to the upper end 58 of the arm 49. The eyelet 64 extends laterally of the arm 49 in the same direction and approximately the same distance that the eyelet 62 extends from the tube 30. The eyelet 62 is thus positioned rearwardly and downwardly from the eyelet 64 whereby when the fishing line 63 extends generally longitudinally of the tube 30 and through the respective eyelets, the arm 49 tends to pivot downwardly and forwardly of the tube 30 when the line is placed under tension.

Figure 6:
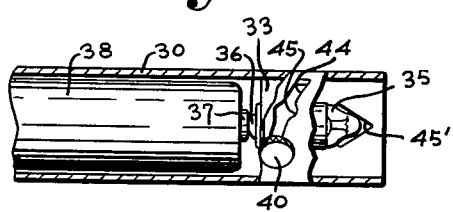
FIG. 6 is a fragmentary sectional view showing the bulb holding disc adjusted to actuated position.

In operation, the signal light 1 is first clamped on the fishing pole, as indicated in FIG. 1. The screw 40 is unscrewed a fraction of a turn by means of the finger knob 41 which permits the disc 33 and screw 40 to be rotated with respect to the tube 30 in the slot 44. The screw 40 and disc 33 are then rotated downwardly and rearwardly as indicated in FIG. 6 to bring the bulb contact 36 into engagement with the battery electrode 37 and also to urge the battery 38 against the insulator washer 55'. The line 63 is then threaded through the eyelets 62 and 64, as indicated in FIG. 1, and tension on the line 63 such as caused by a bite will urge the arm 49 downwardly and forwardly of the tube 30 which urges the plunger 53 against the rear of the battery 38, completing the circuit and lighting the bulb 35. In case of very high tension on the line 63 or accidental heavy contact with the arm 49, the arm 49 is prevented from further forward rotation by contact with the forward wall 60 of the slot 59, thus preventing damage to the battery, bulb or other signal components which could not withstand excess pressure applied thereto. When the tension on the line 63 is released, the spring 55 urges the arm 49 upwardly and rearwardly and also urges the plunger 53 out of contact with the battery 38 to break the circuit and turn off the bulb 35.

When fishing in a moving stream where constant drag on the line is likely to occur, the fishing line 63 may be threaded only through the eyelet 64 whereby it follows the path indicated by the broken lines 63' in FIG. 1. This path requires that a greater tension be placed on the line 63 before actuation of the signalling device.

Figure 7:
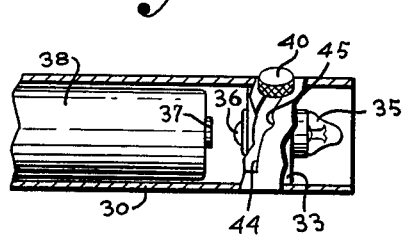
FIG. 7 is a fragmentary sectional view showing the bulb holding disc in deactuated position.
Figure 8:
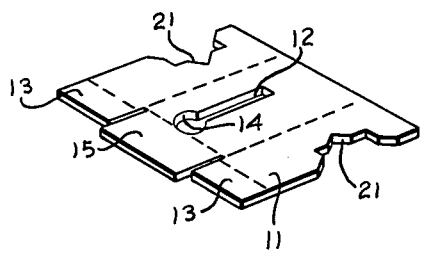
FIG. 8 is a perspective view of the movable clamp member prior to folding.

When not in use, the screw 40 and disc 33 are rotated upwardly and forwardly, to a position indicated in FIG. 7 whereby the bulb 35 is brought out of contact with the battery 38 to prevent an accidental actuation of the signalling device which would run down the battery 38.

The signal light has been described as positioned upwardly of the rod 2, however, it is obvious that the device will operate in the same manner in other positions with respect to the rod 2.

It is to be understood that while I have illustrated and described one form of my invention, it is not to be limited to the specific form or arrangement of parts herein described and shown except insofar as such limitations are included in the claims.

I claim:

1. A fishing signal light for use with a fishing rod having a line thereon comprising, an electrically conductive tube having a rear and a front end, a battery in said tube, electrically conductive means contacting said tube adjacent the front end of said tube and having a socket therein, an incandescent bulb supported in said socket in contact with the battery, said means having a socket being movable longitudinally with respect to said tube, means for selectively locking said means having a socket in a position wherein said battery is remote from said bulb, a fixed electrically conductive plug in said tube adjacent said rear end, an arm, means resiliently, pivotally mounting said arm at one end thereof in said plug for reciprocal motion with respect to said tube, said arm extending upwardly and forwardly of said tube, electrically conductive means responsive to the reciprocal motion of said arm to light the bulb, and eyelets secured respectively to the other end of said arm and to said tube for guiding line in an offset path past said tube whereby variations in tension on said line reciprocates said arm.

2. A fishing signal light for use with a fishing rod having a fishing line thereon comprising, an electrically conductive tube having a rear and a front end, a battery in said tube, an electrically conductive disc in said tube adjacent said front end and slidable longitudinally in contact with said tube, said disc having means forming a threaded bore therethrough extending longitudinally of said tube and forming a socket, an incandescent bulb supported in said socket in contact with the battery, means forming a second threaded bore in said disc perpendicular to the first named bore, means forming a spiral slot in said tube extending through an angle about said tube, a screw extending through said slot and into said second bore in the disc, said screw having a head larger than the width of said slot, a cylindrical electrically conductive plug in said tube adjacent said rear end, means forming a slotted portion in said plug facing rearwardly of said tube, means forming a bore through said plug parallel to but offset from the longitudinal axis of said tube, an electrically conductive plunger having an enlarged head and slidably supported in said plug and extending through said plug bore, said plunger being adapted to contact said battery when urged forwardly of said tube, a spring between said plunger head and said plug and adapted to urge said plunger rearwardly of said tube, an insulator washer between said plug and said battery, an arm, a pin pivotally mounting said arm on said plug in said slotted portion and for reciprocal motion in said slotted portion, said arm extending upwardly and curving forwardly of said tube, means forming a longitudinal slot in said tube, said arm contacting said plunger head and extending through said longitudinal slot, said means forming said longitudinal slot including walls limiting the extent of reciprocal motion of said arm, an eyelet secured to and extending laterally of said arm, and an eyelet integral with said arm mounting pin and offset rearwardly and downwardly from said first-named eyelet, whereby when the fishing line extends through said eyelets, said line tends to pivot said arm downwardly and forwardly of said tube to light said bulb when tensioned.

3. The structure of claim 2 wherein said spiral slot angle extends approximately 90° around the surface of said tube.

4. The structure of claim 2 including a clamp having a rigid strap which extends around said tube intermediate the ends thereof for supporting same.

References Cited in the file of this patent
UNITED STATES PATENTS

| | | |
|---|---|---|
| 2,148,004 | Yagich | Feb. 21, 1939 |
| 2,506,010 | Birkenmaier | May 2, 1950 |
| 2,680,842 | Opphile | June 8, 1954 |
| 2,973,599 | Olson | Mar. 7, 1961 |